United States Patent Office 3,498,911
Patented Mar. 3, 1970

3,498,911
PROCESS FOR REGENERATING MANGANESE ZEOLITE
Yoshio Kikuchi, Matsudo-shi, and Yukuo Naitoh, Tokyo, Japan, assignors to Rohm and Haas Company, Philadelphia, Pa., a corporation of Delaware
No Drawing. Filed June 5, 1968, Ser. No. 734,569
Int. Cl. B01d 15/06
U.S. Cl. 210—30    5 Claims

ABSTRACT OF THE DISCLOSURE

A process for regenerating manganese zeolite filter agents, which have been or are to be employed to remove iron and manganese from aqueous media, which consists of treating the filter agents with an aqueous solution of potassium permanganate and with an aqueous solution of manganese salts so as to form and deposit on the filter agents an oxide of manganese.

---

This invention relates to a process for regenerating filter agents such as manganese zeolite. By "manganese zeolite," as that term is employed throughout the following specification and claims, is meant both the manganese salt form of synthetic gel zeolite and the manganese salt form of natural green sand and the like.

In particular, the invention is directed to a method for regenerating such filter agents by forming and depositing manganese oxide thereon.

More particularly, the invention is concerned with a method for accelerating the rate and increasing the amount of manganese oxide deposition on such filter agent.

Another object of the invention is to increase the efficiency of the regeneration process by increasing the speed of the reaction and decreasing the cost of the regenerant chemicals.

The need for the present invention can perhaps best be understood by considering the state of the art which preceded it. Among the filter agents known to be useful in removing iron and manganese from aqueous media are the manganese zeolites. Those filter agents have been prepared by appropriately treating carrier materials of a naturally occuring source, such as green sand, diatomaceous earth, chamotte and silicate sand, etc., or an artificially prepared material such as synthetic gel zeolite. These carrier materials have heretofore been treated with potassium permanganate so as to convert the filter agents to manganese zeolities. According to the present invention, however, the filter agents are treated alternatively (in any order) with a solution of a manganese salt, such as manganese chloride or manganese sulfate, and with a solution of potassium permanganate, thereby forming an oxide of manganese which is deposited as a layer upon the surface of the carrier materials. The oxide generally consists of brownish-black particles, each between 10 and 50 mesh (U.S. Sieve Size Series), and having a specific gravity nearly equal to that of the carrier material itself.

This novel process for producing manganese zeolite schematically may be represented as follows:

$$Na_2Z + MnSO_4 \longrightarrow MnZ + Na_2SO_4$$
(Zeolite)
$$MnZ + 2KMnO_4 \longrightarrow K_2Z \cdot MnO \cdot Mn_2O_7$$
(Manganese zeolite)

This process results in the formation of manganese zeolites which are far more effective filter agents than are those produced by merely treating zeolites with potassium permanganate. Moreover, the novel process is far less expensive than is its predecessor in the art since much less permanganate is used in the new technique, and the saving in permanganate far exceeds the cost for the manganese salt which is employed.

There have been known two methods for removing iron and manganese from aqueous media by such filter agents, one generally termed the "maganese zeolite method" and the other the "catalytic filter (or catalytic oxidation) method." In the former, the manganese zeolite filter agent simultaneously performs a catalytic action and an oxidizing and filtering action. That method is illustrated by the reaction between ferrous bicarbonate in water and manganese zeolite, the ferric hydroxide which is precipitated as the result of oxidation being filtered off by the layer of manganese zeolite. This reaction is schematically represented as follows:

$$K_2Z \cdot MnO \cdot Mn_2O_7 + 4Fe(HCO_3)_2 + 2H_2O \rightarrow$$
$$K_2Z + 3MnO_2 + 4Fe(OH)_3 + 8CO_2$$

In the manganese zeolite method it is necessary to regenerate the oxidizing activity of the manganese oxide on the surface of the filter since, as can be seen from the equation just set forth above, the oxide is consumed in the oxidation of iron and manganese.

In the catalytic filter method the filter agent also performs catalytic and filter actions, but the filter is not employed to oxidize the manganese or iron which is to be removed from aqueous media. This necessary oxidation step is instead carried out either by means of oxygen already present in the aqueous media or by an oxidizing agent such as chlorine, sodium hypochlorite or potassium permanganate, which is added thereto prior to contacting the aqueous media with the filter material. In this method, in addition to the manganese zeolite filter agent there may be employed soft manganese ores which have no oxidizing ability (an example being the ore of manganese dioxide) since they have considerable catalytic capacity.

The chemical reaction by which iron, for example, may be removed through use of the catalytic filter method is illustrated in the following reaction, the sodium hypochlorite having been added to the aqueous media being treated:

$$2Fe(HCO_3)_2 + NaClO + H_2O \xrightarrow{\text{catalytic action}} 2Fe(OH)_3 + NaCl + 4CO_2$$

One problem with this system has been that as this reaction proceeds over a prolonged period of time the catalytic ability of the filter agents diminishes and it becomes necessary to regenerate them. This is due to the fact that the manganese oxide on the surface of the filter agents gradually is consumed in the oxidation of the iron or manganese in the aqueous media. The $MnO_2$ which is formed flows out of the system when the fiter agents are backwashed with water (a normal step in the process), or is dissolved to a great extent in the treated water when the pH value of the water being treated is relatively low, e.g. 6.5 or less.

Another problem has been that, when the amount of oxygen dissolved in the original aqueous media or the amount of added oxidizing agent is insufficient to oxidize the iron or manganese, the consumption of the $MnO_2$ on the surface of the manganese zeolite naturally increases and the need to regenerate the zeolite occurs with greater frequency.

Until the present invention the practice with regard to the regeneration of the manganese zeolite generally has been to dip the filter agent in a 1–5% aqueous solution of potassium permanganate for 6 to 12 hours to accomplish the result schematically illustrated by the following equation:

$$K_2Z + 2KMnO_4 + Mn^{++} \rightarrow K_2Z - MnO \cdot Mn_2O_7 + 2K^+$$

($Mn^{++}$ in this equation is the manganese cation formed by the decomposition of potassium permanganate and manganese zeolite.) The resulting product is then washed with water until the coloration of the potassium permanganate in the washing liquor disappears, a very time-consuming process and one which is very expensive since it utilizes a relatively costly regenerating agent in high concentrations.

All of the foregoing problems have been satisfactorily resolved by the present invention according to which the filter agents are regenerated by using aqueous solutions of manganese salts such as manganese chloride or sulfate in addition to aqueous solutions of potassium permanganate.

Reverting to the previous description of the prior art regeneration technique, it is of interest to note that when the filter agents are only dipped into an aqueous solution of potassium permanganate the reaction rate of manganese oxide deposition is very slow. As a result, the quantitative formation of manganese oxide is inadequate for all practical purposes since the amount of manganese ions is extremely small. However, this formation is vastly accelerated, due to the present invention, in accordance with which we provide an aboundance of manganese ions for the reaction. As a primary consequence, the rapid formation of the manganese oxide on the surface of the filter agents shortens the period necessary for the regeneration of those agents with the aqueous solutions of potassium permanganate and manganese salts. As a further consequence, there results an appreciable saving in the cost of chemicals employed in the regeneration by making them react without any significant loss.

The novel regenerations method of the present invention can best be understood by reference to the actual examples thereof set forth below.

EXAMPLE I

(A) General description

The layer of filter agents consisting of manganese zeolite, in a filter column to be regenerated, was backwashed at an appropriate flow rate to eliminate the sediment and other contaminants on the surface of the agents. For this purpose a fresh water may have been used, but it was found preferable to use water which has been treated with the filter agents so as to have been made substantially free of iron and manganese.

After backwishing, the water in the filter column was drained off, and an aqueous solution of manganese sulfate was introduced upflow from the bottom of the column. This intrduction was terminated when the level of manganese sulfate solution rose just above the surface of the filter layer and the manganese sulfate was retained in that condition for over 30 minutes. The purpose of draining off the water was to avoid dilution and maintain a uniform concentration of manganese sulfate solution throughout the column. The purpose of introducing the manganese sulfate solution upflow was to prevent the formation of bubbles in the filter layer, thereby helping to make a homogeneous contact between the filter layer and the manganese sulfate solution.

The next step was to introduce an aqueous solution of potassium permanganate, also by an upflow procedure (although a downflow procedure is an equally acceptable option), the manganese sulfate solution being displaced thereby. As before, the flow of the permanganate solution was stopped when the filter layer was completely immersed therein, and the filter layer was maintained in that condition for over 30 minutes. Then the permanganate solution was drained off, and the filter layer backwashed with water for at least 4–5 minutes at an approximate flow rate. As before, the preferred water was employed, namely water that had been treated with the filter layer to remove iron and manganese therefrom.

Upon completion of this water backwash the filter layer was washed with the water to be treated, employing a downflow technique, this treatment being continued until the eluate began to show evidence of containing iron and manganese in amounts which were less than the pre-determined values of both metals known to be present in the water to be treated. At this point the regeneration steps described above were practiced again in cyclical fashion. It was noted, incidentally, that the chemicals employed were quantitatively far less than were employed in the prior art regeneration processes. Furthermore, the entire process was far less expensive than its predecessors in the art because the concentration of potassium permanganate in the present invention is much smaller, and because the manganese salts which are added are in such low concentrations that their total cost is far outweighed by the cost of potassium permanganate that is saved.

(B) Specific description 13 liters of a commercially available manganese zeolite, whose capacity for removing iron and manganese from aqueous solutions thereof had been substantially exhausted, were stuffed into three stainless steel columns each having a diameter of 15.9 cm. and a depth of 76 cm. The height of the zeolite filter layer in each column was approximately 65 cm. The manganese zeolite which was employed had the following properties:

Apparent specific properties _____ 1
Percentage of interspace _____ 35
Effective diameter _____mm__ 0.64
Homogeneity coefficient _____ 1.87

The process according to the present invention was carried out in one filter column, which is designated hereafter as A, and the process of the prior art involving the exclusive treatment with potassium permanganate was carried out in the remaining two columns hereinafter identified as columns B and C.

(In the following procedures the water employed in all washing and backwashing steps contained neither iron nor manganese, and had a pH value of 6.8–7.2.) All three columns were backwashed with water, which was substantially free of manganese, for about 5 minutes, at a rate of 500 l./hr., and the water in the columns then drained off. Next, a 0.3% solution of manganese sulfate was introduced upflow from the bottom in column A until the level of the solution reached a point a little above the surface of the manganese layer so that the entire filter layer was immersed, and the columns kept in that condition for about 30 minutes. Then, a 0.4% aqueous solution of potassium permanganate gradually was introduced upflow from the bottom of each of the columns, thereby forcing the aqueous manganese sulfate solution out of each column, until the filter layers in each column were completely covered with the permanganate solution, in which condition the columns were maintained for about 40 minutes. Each column next was emptied of the permanganate solution, backwashed for about 5 minutes at a flow rate of 400 l./hr. After this backwash the manganese zeolite layer was washed with water introduced downflow from the top of the column at a flow rate of 300 l./hr. until the coloration caused by potassium permanganate could no longer be perceived in the wash water drained from the column. This completed the regeneration of the zeolite filter layer in column A, in accordance with the present invention.

(As with column A, the water employed in the washing and backwashing steps of columns B and C described below, also was free of iron and manganese and had a pH of 6.8–7.2.) The regeneration of the zeolite in column B was as follows: A 1% aqueous solution of potassium permanganate was introduced upflow from the bottom of the column until the manganese zeolite layer was completely immersed therein. Water was then introduced downflow at a flow rate of 300 l./hr until the eluting water was no longer colored with the permanganate, at which point the filter layer in column B was considered completed.

The filter layer in column C was regenerated exactly the same as in column B except that a 2% solution of potassium permanganate was used.

The periods necessary for the disappearance of the coloration of the potassium permanganate in columns A, B and C, and consequently for the regeneration of the zeolite, were 5 minutes, 40 minutes, and 45 minutes, respectively.

The water which was treated was introduced into the regenerated columns downflow from the top at a flow rate of 300 l./hr., and the amount of iron in the eluate was determined by means of the o-phenanthrene method. The water which was treated was obtained from a well and possessed the following characteristics:

| | |
|---|---|
| pH value | 6.3 (after adjusting, 6.9). |
| Total iron | 6.5 p.p.m. (calculated as Fe). |
| Dissolved iron | 6.5 p.p.m. (calculated as Fe). |
| $Fe^{++}$ | 6.4 p.p.m. (calculated as Fe). |
| Manganese | 0.00 p.p.m. (calculated as Mn). |
| Dissolved oxygen | 3.3 p.p.m. (calculated as O). |

Since the pH value of the water which was treated was 6.3, it was adjusted to 6.9 by continuously adding a solution of sodium hydroxide with the aid of a pump, the object being to prevent solution and consequent loss of the manganese or manganese zeolite.

The effluents from each column were tested at regular intervals to determine the points at which a significant quantity of iron was present, thereby indicating that the resin no longer was efficiently acting to take iron out of the water being treated. In the case of column A, over 1100 liters of water were processed before any iron leakage into the effluent was noted. In the case of column B, only 500 liters of water were processed before a significant leakage of iron was noted. In the case of column C, about 900 liters of water were processed before the leakage of iron reached the rejection point. Column A, which represents the method of the present invention, was therefore more than twice as effective as column B and approximately 20% more effective than column C, the latter two representing the best known procedures of the prior art.

It should be understood that the present invention is capable of being practiced by persons skilled in the art with numerous variations from the particular illustrations set forth above, without departing from the spirit and scope of the invention as defined in the claims set forth below. For example, it has already been indicated that the permanganate and manganese salt treatments may be applied to the zeolite in either order. More than one manganese salt may be used, as in a mixture thereof. The concentrations and times of application of each solution may also be varied quite extensively, more time being required as a rule if more dilute solutions are used and vice versa if more concentrated solutions are employed. Also, of course, the concentrations of the solutions and lengths of treatments therewith will depend upon the amount of zeolite to be regenerated and the degree of regeneration of the zeolite which one wishes to achieve. It is, moreover, a matter of choice as to whether one sends the permanganate and manganese salt solutions upflow or downflow in the columns. All of these options, and more, are well within the province of the skill now existent in the art.

We claim:

1. A process for regenerating manganese zeolite filter agents that are useful for removing iron and manganese from aqeuous media, which consists of treating said filter agents alternately and sequentially with an aqeuous solution of potassium permanganate and an aqueous solution of a salt selected from the group consisting of manganese chloride and manganese sulfate, the concentrations of the permanganate and the manganese salt being sufficient to form manganese oxide on the sruface of said filter agents, and the length of time of said treatment being sufficient to enable the manganese oxide to be formed and further being variable inversely with the concentrations of the permanganate and manganese salt and directly with the degree of regeneration sought to be effected.

2. The process of claim 1 in which manganese zeolite filter agents are contained in a columnar vessel, and the permanganate and manganate salt solutions are passed upflow through the vessel in contact with the zeolite.

3. The process of claim 1 in which the manganese zeolite filter agents are contained in a columnar vessel, and the permanganate and manganate salt solutions are passed downflow through the vessel in contact with the zeolite.

4. A process consisting of a water pretreatment followed by the process of claim 1 in which, when the water being treated is definitely acidic, a base is added thereto in sufficient quantity and strength to bring the pH of the water close to neutral in order to minimize loss of the manganese and manganese zeolite, and then the regeneration process of claim 1 is employed.

5. In a process for removing iron and manganese which may be present in aqueous media, by treating the aqueous media with a manganese zeolite, the improvement which consists in using in said treatment a manganese zeolite that has had added to the surface thereof an effective amount of active magnesium oxide by virtue of having applied to the zeolite the regeneration process of claim 1.

References Cited

UNITED STATES PATENTS

| | | | |
|---|---|---|---|
| 951,641 | 3/1910 | Gans | 23—112 X |
| 2,004,257 | 6/1935 | Tschirner | 210—32 X |
| 3,192,156 | 6/1965 | Joyce | 210—38 X |

SAMIH N. ZAHARNA, Primary Examiner

U.S. Cl. X.R.

210—38; 23—112; 252—455